United States Patent [19]

Frazier

[11] 3,972,767
[45] Aug. 3, 1976

[54] APPARATUS FOR FORMING A TIRE BREAKER

[75] Inventor: Larry C. Frazier, Sun City, Ariz.

[73] Assignee: National-Standard Company, Niles, Mich.

[22] Filed: Feb. 13, 1975

[21] Appl. No.: 549,849

[52] U.S. Cl.............................. 156/397; 156/405; 156/433; 156/439
[51] Int. Cl.². ........................................ B29H 17/28
[58] Field of Search................ 156/110 R, 117, 123, 156/128 R, 128 I, 133, 166, 176, 177, 394, 397, 405, 433, 436, 437, 438, 439, 440

[56] References Cited
UNITED STATES PATENTS

| | | | |
|---|---|---|---|
| 1,026,648 | 5/1912 | Bayne et al. | 156/397 |
| 1,250,917 | 12/1917 | Mcleod | 156/117 |
| 1,317,664 | 9/1919 | Nail | 156/117 |
| 3,002,874 | 10/1961 | Lowe | 156/128 I |
| 3,082,140 | 3/1963 | Vanzo | 156/110 R |
| 3,616,001 | 10/1971 | Addis | 156/117 |
| 3,823,049 | 7/1974 | Vetrovec | 156/177 |
| 3,894,906 | 7/1975 | Pearce et al. | 156/123 |

Primary Examiner—Douglas J. Drummond
Assistant Examiner—John E. Kittle
Attorney, Agent, or Firm—Johnson, Dienner, Emrich & Wagner

[57] ABSTRACT

A tire breaker is formed from a cord on a gum base supported on a work belt. A rotor member is mounted above the work belt, and includes inner and outer cord engaging and laying means. Upon intermittent rotation of the rotor member, the cord engaging and laying means engage the cord, fold the same into successive side-by-side loops, and lay the loops on the gum base.

17 Claims, 35 Drawing Figures

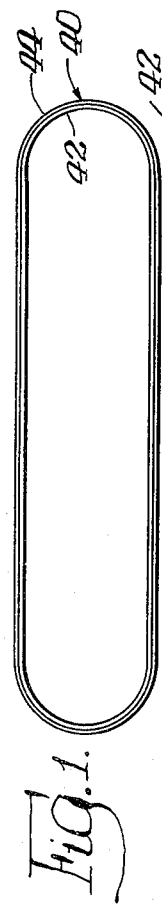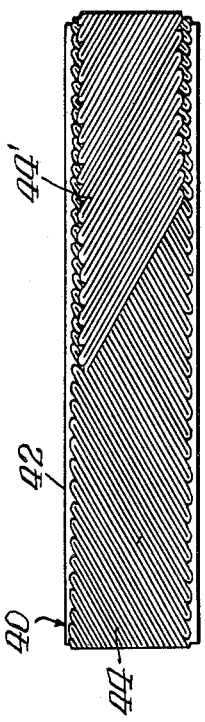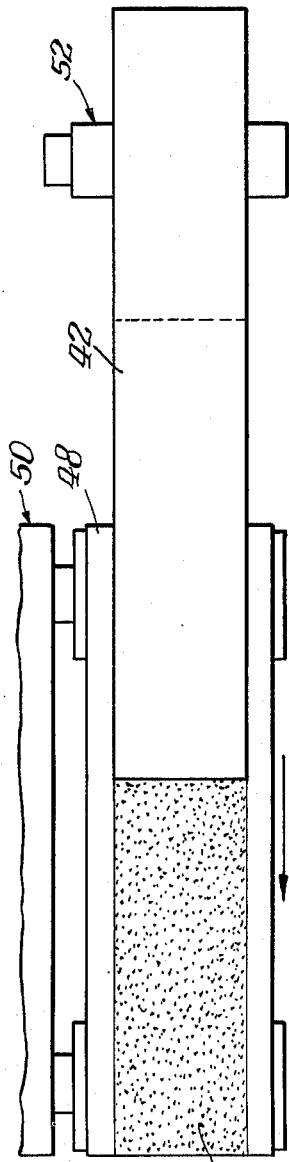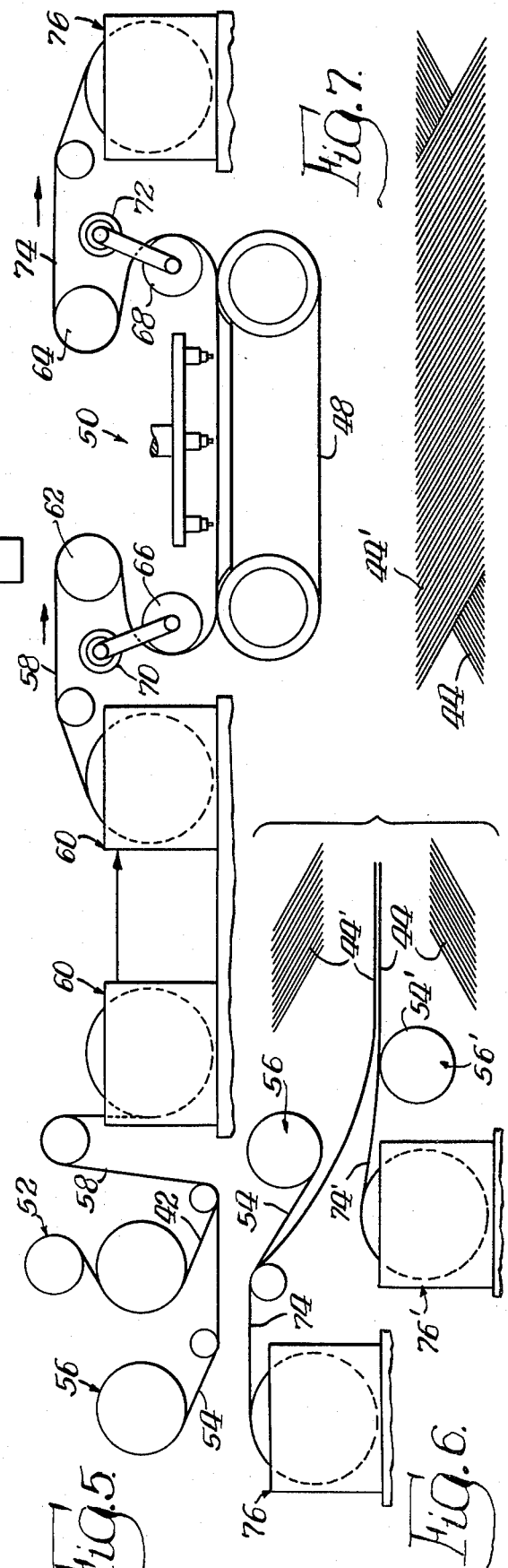

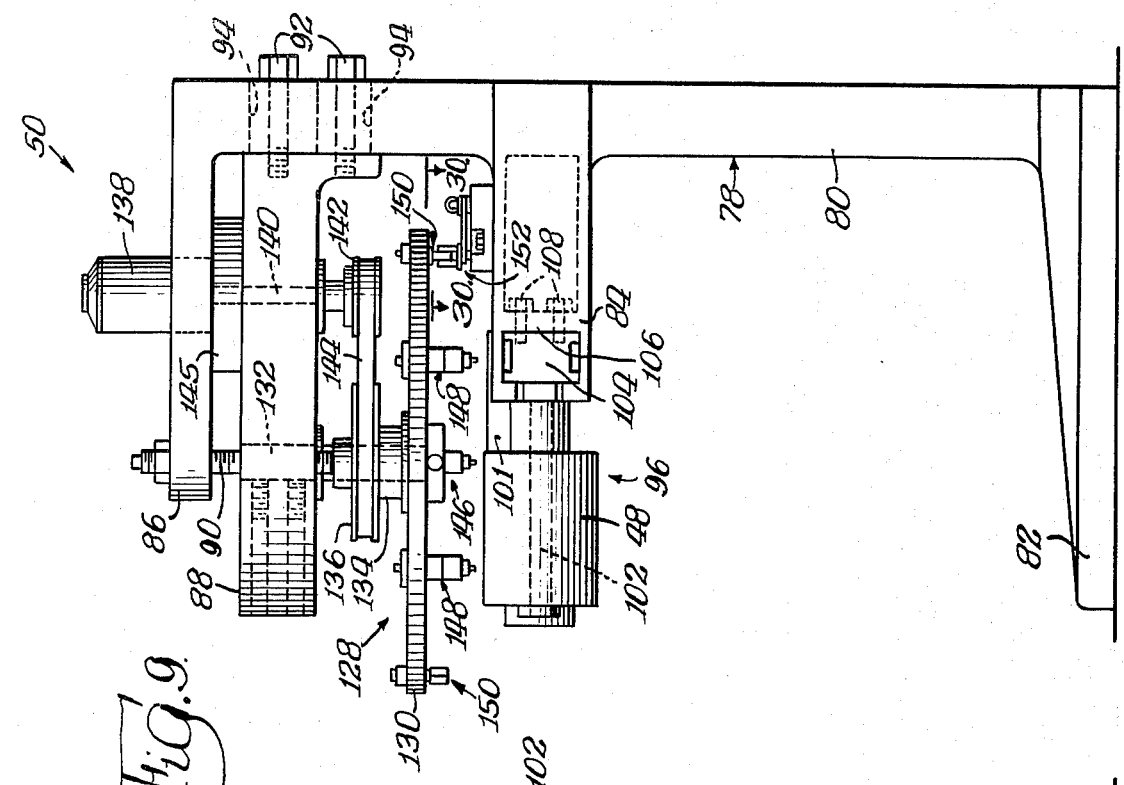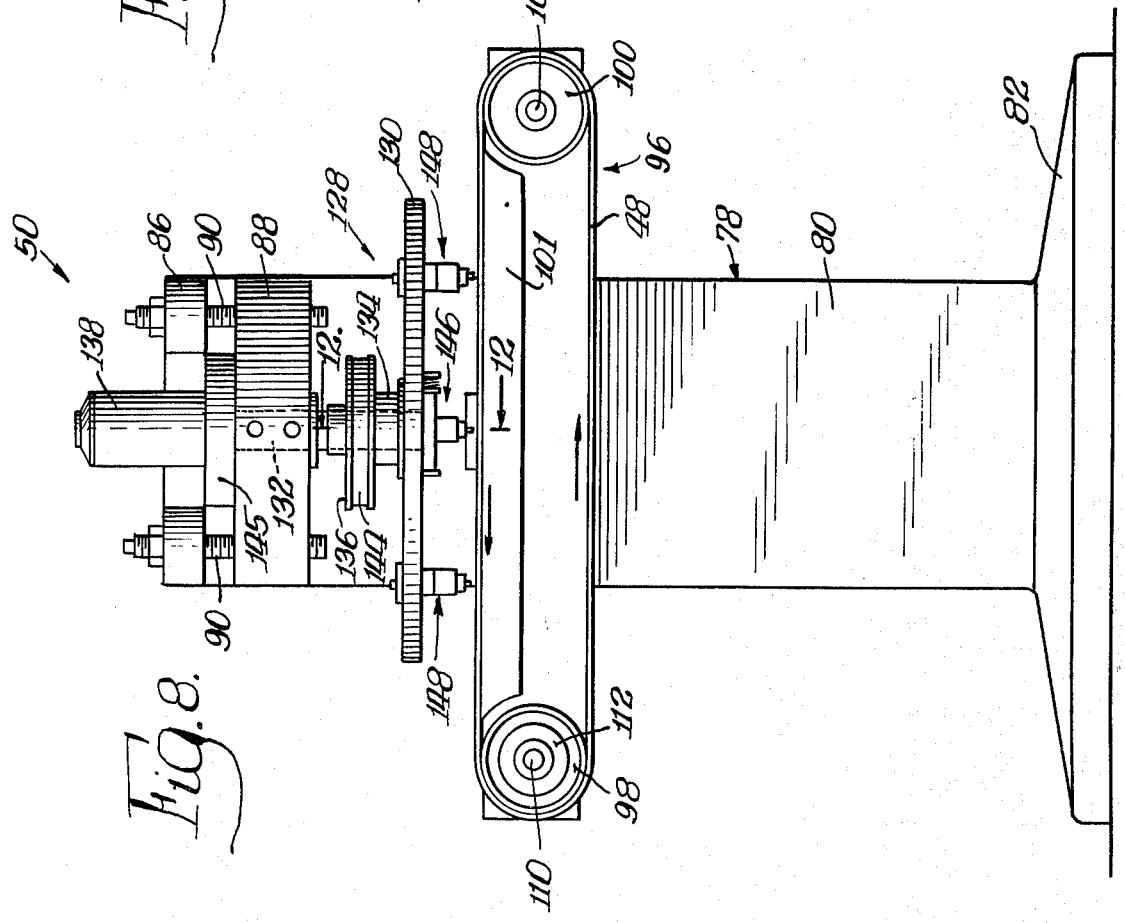

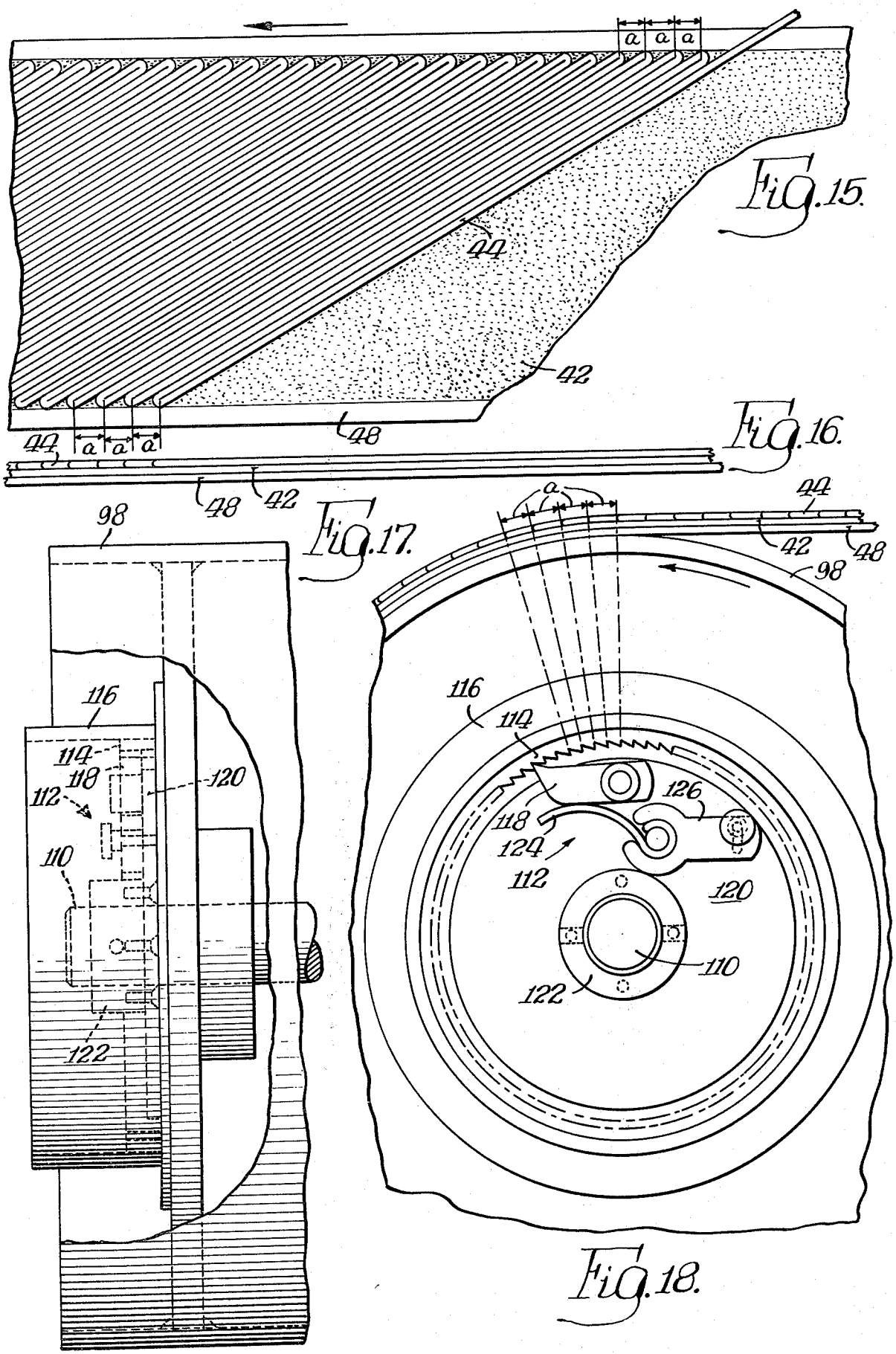

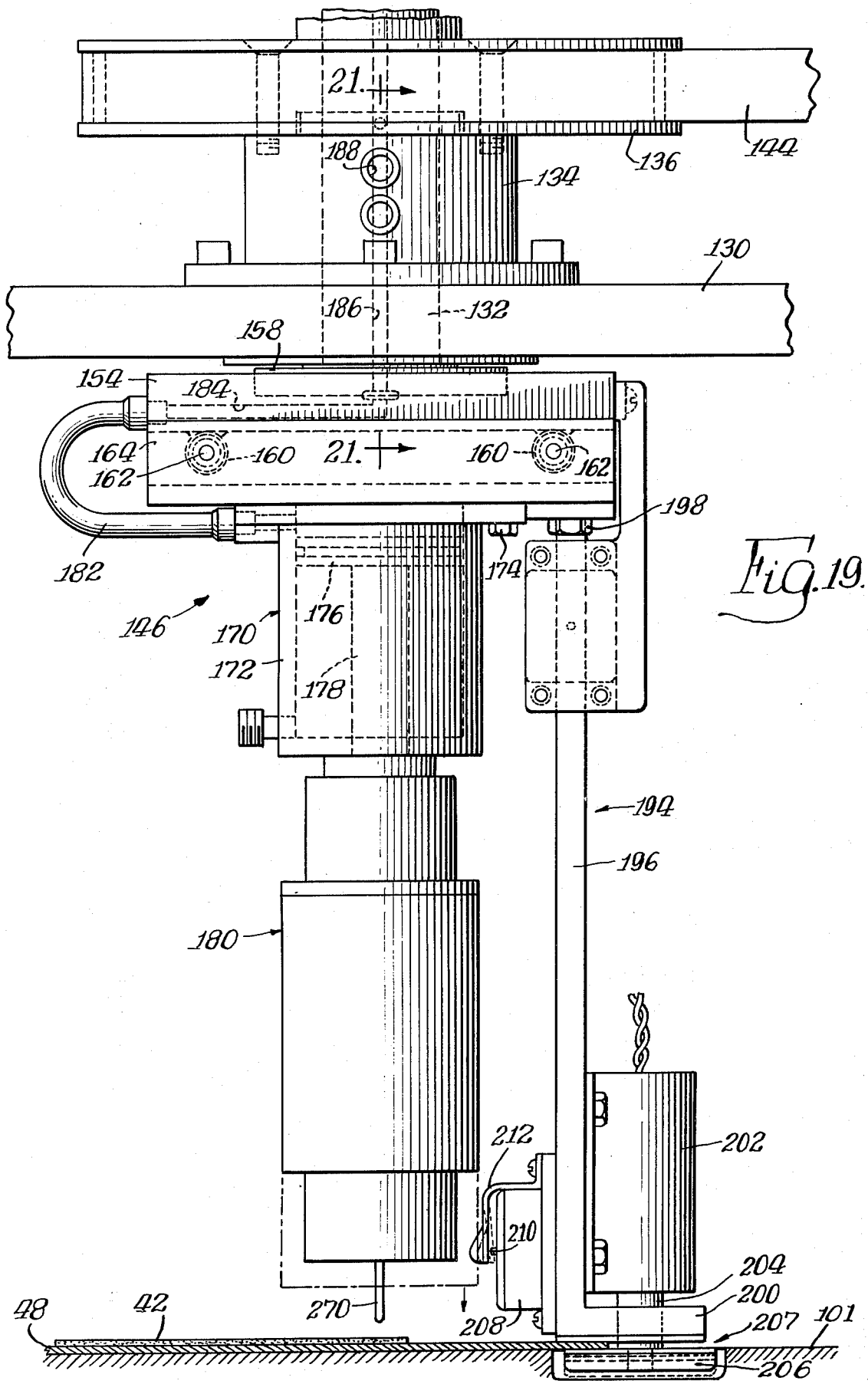

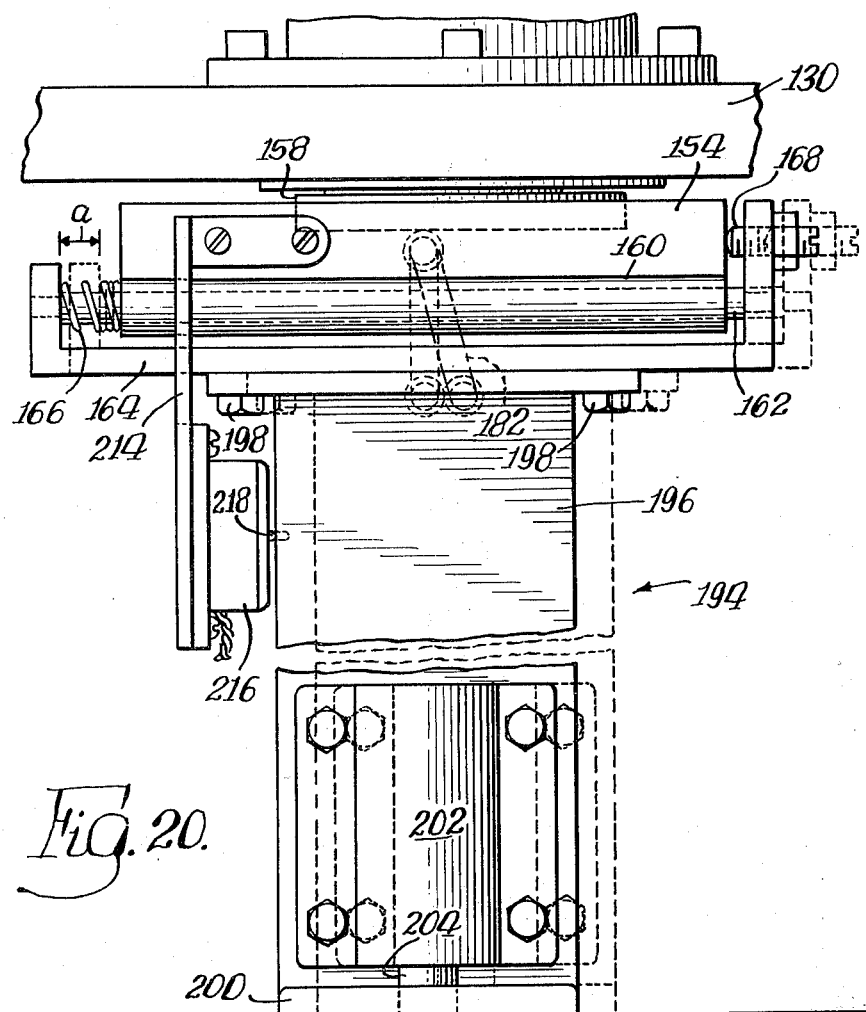
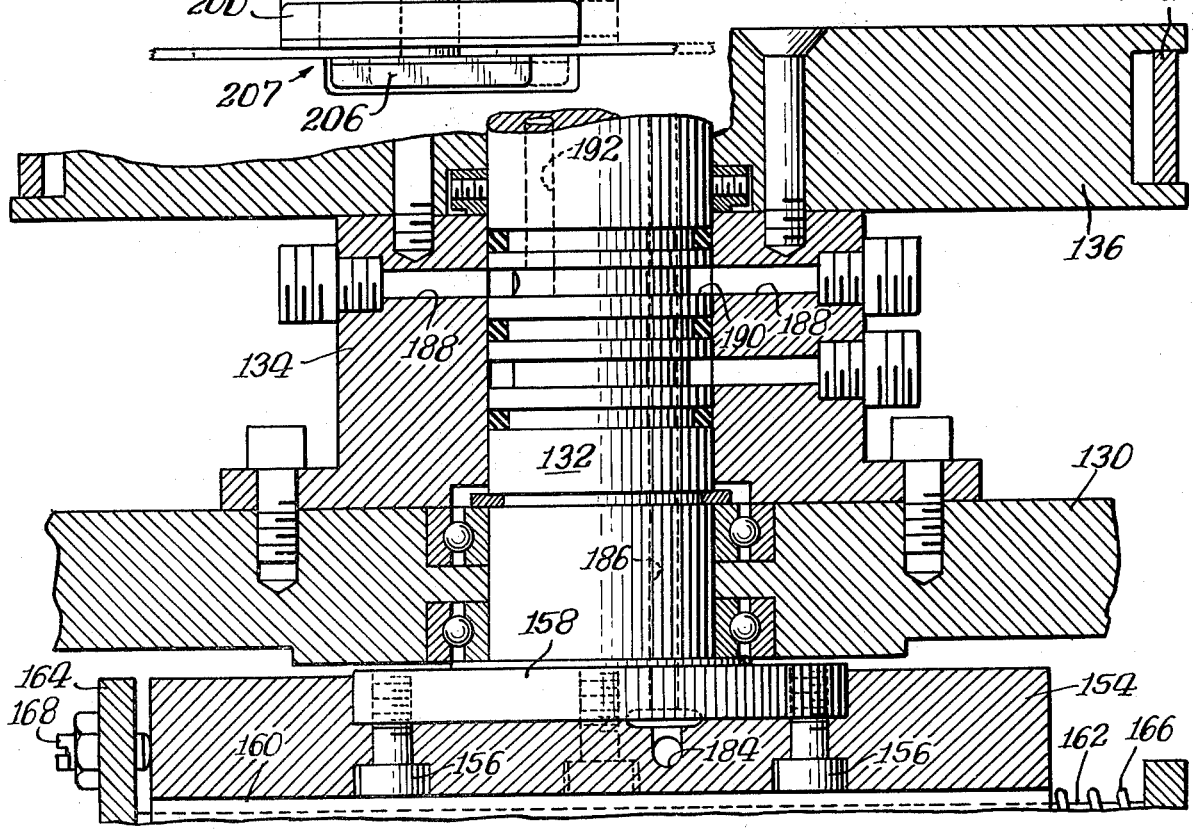

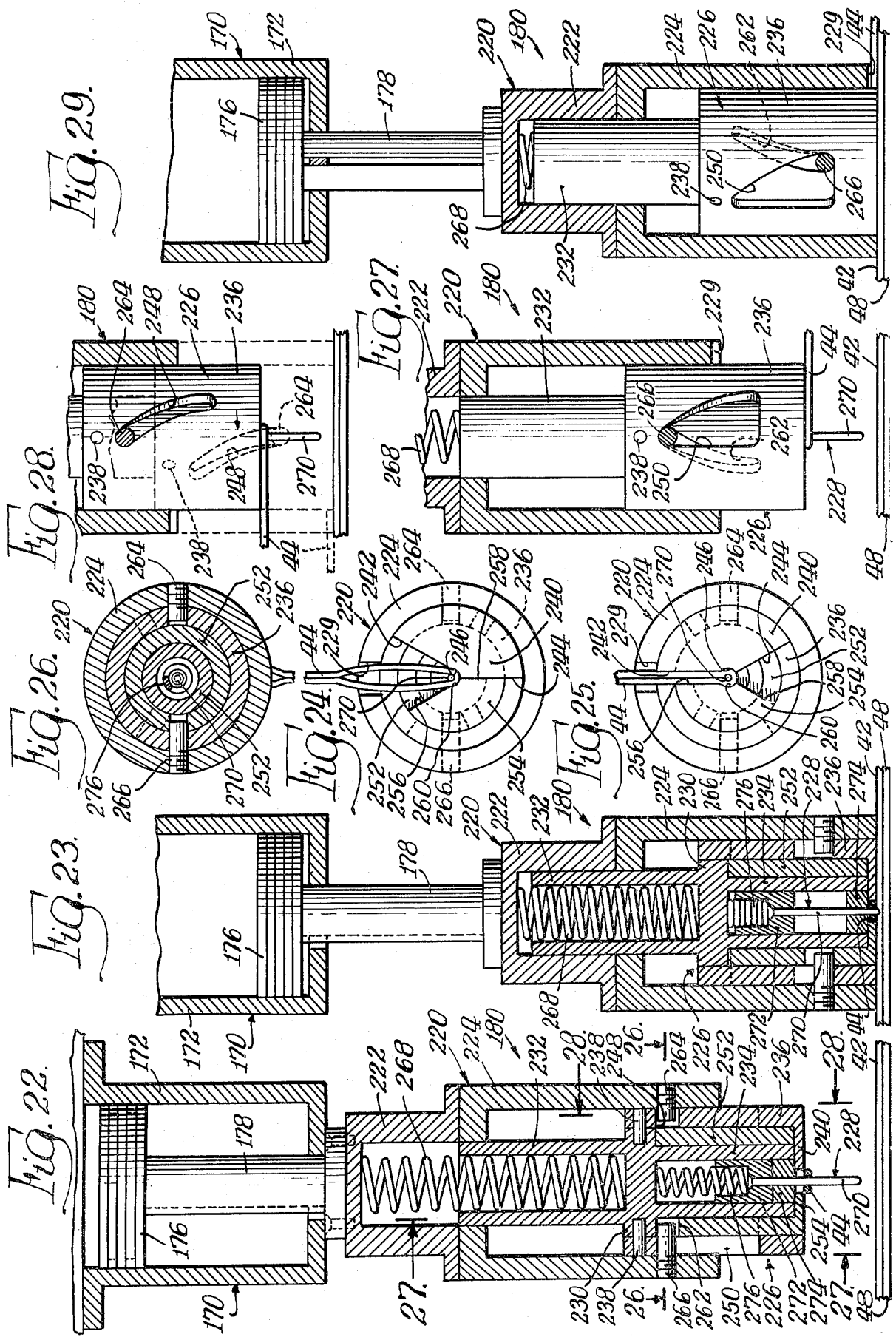

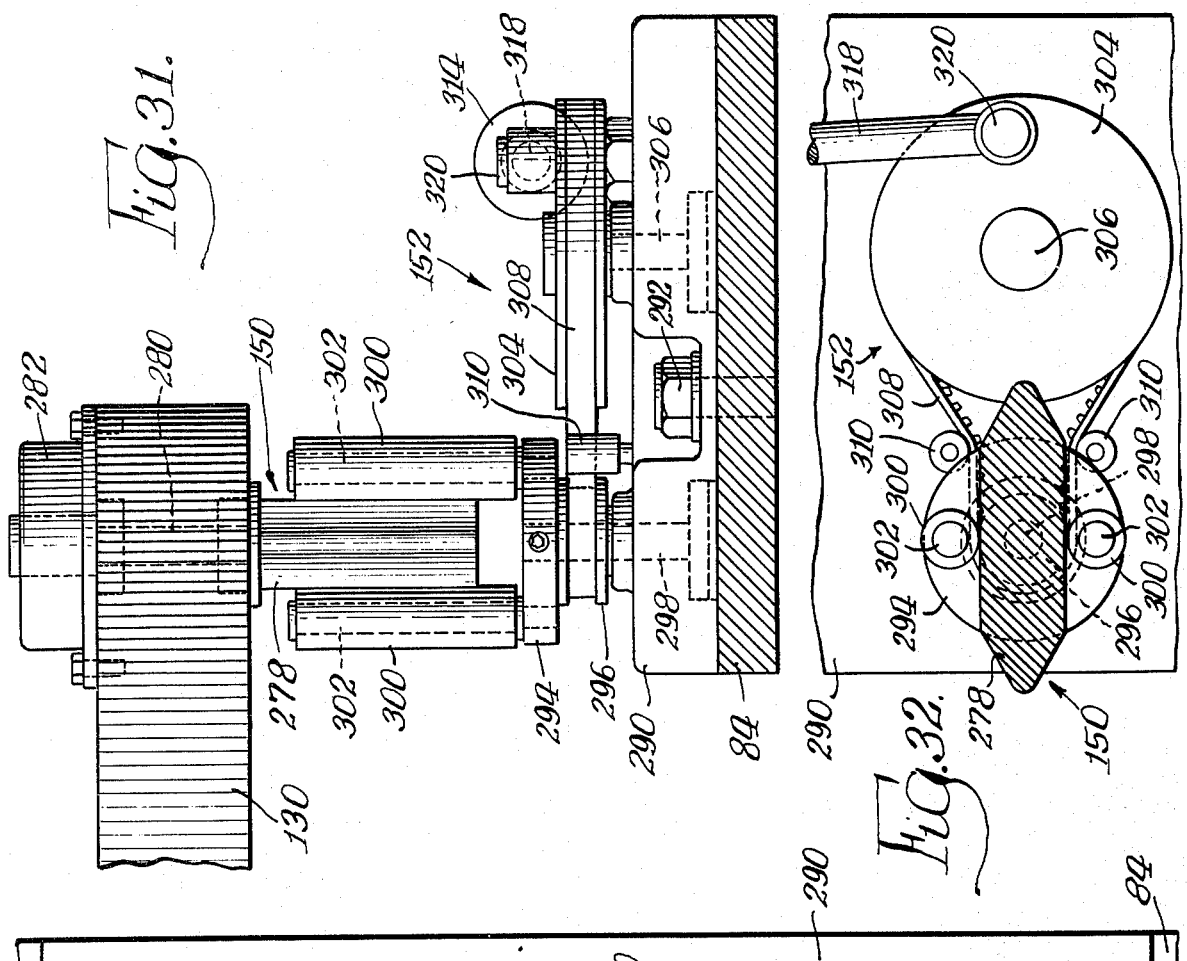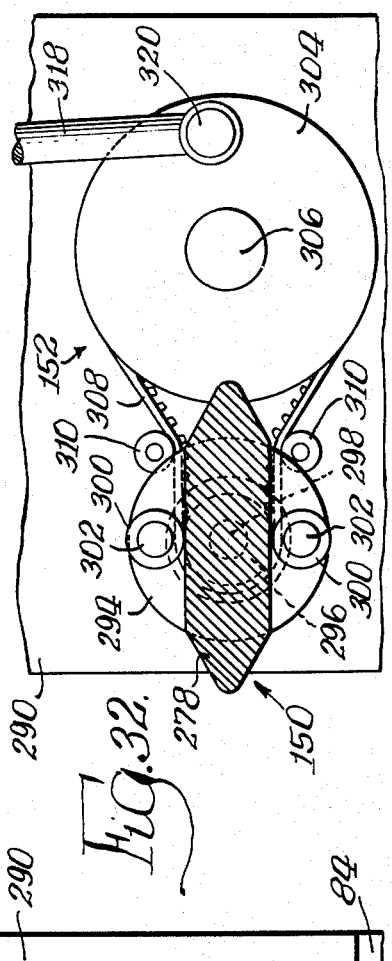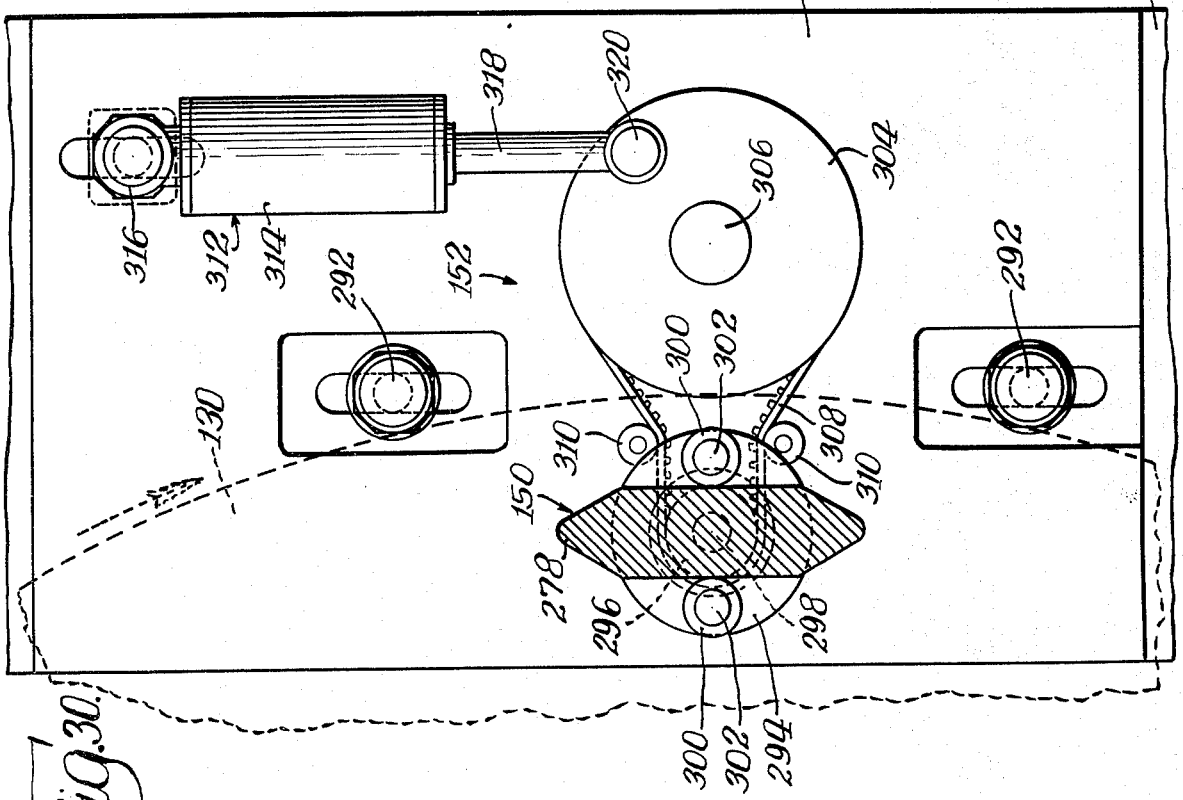

3,972,767

APPARATUS FOR FORMING A TIRE BREAKER

FIELD OF THE INVENTION

The present invention is directed to apparatus that may be utilized either to form unitary annular tire breakers of appropriate size to be applied to tires, or to form continuous tire breaker components which are thereafter combined and cut into sections of suitable length to be applied to tires.

SUMMARY OF THE INVENTION

The apparatus of the present invention is adapted for forming a tire breaker from a cord on a gum base, and includes a work belt supporting the gum base. A rotor member is mounted on frame means for rotation above the work belt on an axis adjacent one side of the latter, and means are provided for rotating the rotor member in increments of about 180°. A pair of diametrically opposed outer cord engaging and laying means are carried by the rotor member on opposite sides of its rotative axis, and an inner cord engaging and laying means is mounted on the frame means adjacent the rotative axis of the rotor member.

During successive increments of rotation of the rotor member, the inner cord engaging and laying means is engaged by the cord and serves as a reaction point, while the outer cord engaging and laying means alternately engage the cord and fold the same into successive side-by-side loops with portions of the cord disposed in parallel juxtaposed relation diagonally of the work belt as the latter is advanced stepwise. At the termination of each increment of rotation of the rotor member, the inner and outer cord engaging and laying means lay each loop of the cord on the gum base.

BRIEF DESCRIPTION OF THE DRAWINGS

FIG. 1 is a side elevational view of an annular tire breaker component;

FIG. 2 is a plan view of the tire breaker component of FIG. 1;

FIG. 3 is a plan view, corresponding generally to FIG. 2, and showing a partially applied second layer of cord;

FIG. 4 is a partial plan view showing how a gum base is secured about a work belt;

FIG. 5 is a schematic view of apparatus for forming a continuous tire breaker component;

FIG. 6 is a schematic view of apparatus for applying two breaker components together to form a complete tire breaker;

FIG. 7 is a plan view of a length of continuous tire breaker;

FIG. 8 is a front elevational view of the apparatus of the present invention;

FIG. 9 is a side elevational view of the apparatus of FIG. 8;

FIG. 15 is a plan view of a portion of a tire breaker component formed on the work belt of the apparatus of the present invention;

FIG. 16 is a side elevational view of the tire breaker component and work belt of FIG. 15;

FIG. 17 is a side elevational view of the ratchet means for preventing backward rotation of the work belt;

FIG. 18 is a front elevational view of the ratchet means of FIG. 17;

FIG. 19 is a side elevational view of the inner cord engaging and laying means incorporated in the apparatus of the present invention;

FIG. 20 is a foreshortened rear elevational view of the work belt advancing means associated with the inner core engaging and laying means of FIG. 19;

FIG. 21 is a partial vertical sectional view taken substantially along the line 21—21 in FIG. 19 looking in the direction indicated by the arrows;

FIG. 22 is a vertical median sectional view of cord engaging and laying means in a normal elevated position;

FIG. 23 corresponds generally to FIG. 22 but shows the cord engaging and laying means in a lowered cord-laying position;

FIG. 24 is a bottom view of the cord engaging and laying means of FIG. 22;

FIG. 25 is a bottom view of the cord engaging and laying means of FIG. 23;

FIG. 26 is a horizontal sectional view taken substantially along the line 26—26 in FIG. 22 looking in the direction indicated by the arrows;

FIg. 27 is a sectional view taken substantially along the line 27—27 in FIG. 22 looking in the direction indicated by the arrows;

FIG. 28 is a sectional view taken substantially along the line 28—28 in FIG. 22 looking in the direction indicated by the arrows;

FIG. 29 corresponds generally to FIG. 27 but shows the components in a cord-laying position;

FIG. 30 is a plan view of the rotor locating means incorporated in the apparatus of the present invention;

FIG. 31 is an end elevational view of the rotor locating means of FIG. 30;

FIG. 32 corresponds generally to a portion of FIG. 30 but shows the components in a changed position;

DESCRIPTION OF THE PREFERRED EMBODIMENT

Figure 10:
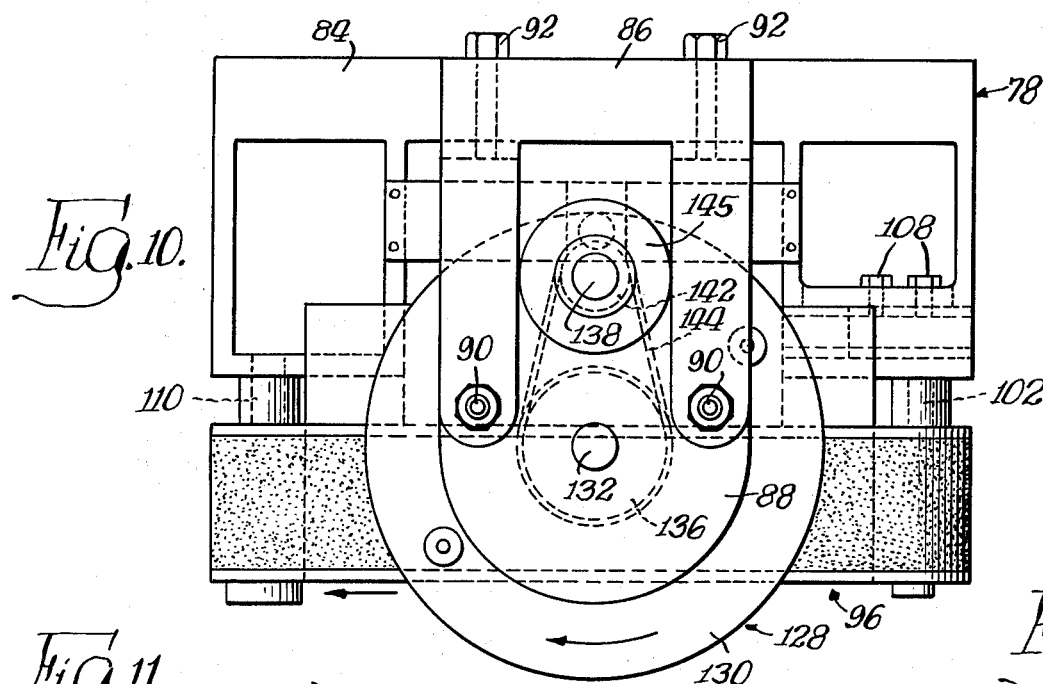
FIG. 10 is a plan view of the apparatus of FIG. 8.

The apparatus of the present invention may be utilized to form unitary annular tire breakers of appropriate size to be applied to tires. FIGS. 1 and 2 show an annular tire breaker component 40 comprised of a gum base 42 and a layer of inclined sections of rubber covered cord 44, while FIG. 3 shows the tire breaker component 40 with a partially applied second layer of oppositely inclined sections of cord 44'. In forming an annular tire breaker, as shown in FIG. 4, a cement 46 is applied to an endless work belt 48 of the apparatus 50 of the present invention, and a gum base 42 is withdrawn from a supply roll 52 and secured about the work belt 48 by the cement 46. Then, a layer of inclined sections of cord 44 (FIG. 2) is laid on the gum base 42 by the apparatus 50 in a manner to be fully described hereinafter. Finally, a second layer of oppositely inclined sections of cord 44' (FIG. 3) is laid on the layer of cord 44 to form a complete annular tire breaker. The breaker length is determined by the peripheral length of the work belt 48 which is fabricated of a nonextensible material such as metal.

The apparatus of the present invention may also be utilized to form continuous tire breaker components which are thereafter combine and cut into sections of suitable length to be applied to tires. In forming a continuous tire breaker component, as shown in FIG. 5, a gum base 42 withdrawn from a supply roll 52 is first applied to an inextensible liner 54 withdrawn from a supply roll 56, and the composite band 58 of liner and gum base is stored in a container 60. Then, the container 60 is moved to a position adjacent the apparatus 50 of the present invention, and a continuously-moving freely-floating loop of the band 58 is directed by drive rollers 62 and 64 to the upper surface of the work belt 48 where a layer of inclined sections of cord is laid on the gum base by the apparatus 50 in a manner to be fully described hereinafter. Movement of the loop of the band 58 is correlated with movement of the work belt 48 by pivotally suspended idler rollers 66 and 68 which, in response to pivotal movement caused by the loop, operate rheostats 70 and 72 that control the speed of the drive rollers 62 and 64. The composite band 74 of liner and inclined laid cord is stored in a container 76. In a similar manner, a composite band 74' of liner and oppositely inclined laid cord is formed and stored in a container 76'. Finally, as shown in FIG. 6, the liner 54 of the band 74 is separated from the layer of inclined sections of cord 44 and collected on a roller 56, the liner 54' of the band 74' is separated from the layer of oppositely inclined sections of cord 44' and collected on a roller 56', and the two breaker layers of components are applied together to form a complete continuous tire breaker (FIG. 7).

The cord laying apparatus 50, as shown in FIGS. 8, 9 and 10, comprises main frame means 78 which includes a vertical back frame section 80, a forwardly extending base frame section 82, a forwardly projecting generally U-shaped intermediate frame section 84, a forwardly projecting generally U-shaped upper frame section 86, and a forwardly projecting frame element 88 secured to the back frame section 80 immediately below the upper frame section 86. The frame element 88 is vertically adjustable by screws 90 suspended from the upper frame section 86, and is locked in adjusted position by bolts 92 disposed through slots 94 in the back frame section 80.

Mounted at the forward end of the intermediate frame section 84 is an endless work belt assembly 96 which comprises leading and trailing pulleys 98 and 100. The aforementioned endless work belt 48 is trained over the pulleys 98 and 100 with the upper run being supported on a shelf or table 101 secured to the intermediate frame section 84. The trailing pulley 100 is rotatably mounted on a spindle 102 having an anchor or head portion 104 which is laterally adjustable within a guideway 106 formed in one of the leg portions of the intermediate frame section 84 and which is secured in adjusted position by bolts 108. The leading pulley 98 is rotatably mounted on a spindle 110 suitably secured in the other of the leg portions of the intermediate frame section 84. Mounted between the leading pulley 98 and spindle 110 is ratchet means 112 for preventing backward rotation of the leading pulley 98. As shown in FIGS. 17 and 18, the ratchet means 112 comprises a ratchet ring 114 secured within an annular casing 116 which in turn is secured to the leading pulley 98. Associated with the ratchet ring 114 is a ratchet lever 118 pivotally mounted to a disc 120 secured to a hub 122 which in turn is secured on the spindle 110. The ratchet lever 118 is biased into engagement with the ratchet ring 114 by a pivotally mounted spring 124 with which is associated an adjustable spring tension arm 126 carried by the disc 120.

Arranged between the frame element 88 and the work belt assembly 96, as shown in FIGS. 8, 9 and 10, is a rotor assembly 128. The rotor assembly 128 includes a horizontal circular rotor member 130 rotatably mounted on the lower end of a vertical stationary shaft 132 which at its upper end is secured in the frame element 88. The rotor member 130 is mounted for rotation above the work belt 48 on an axis adjacent one side of the latter. Also rotatably mounted on the shaft 132 is a fluid gland 134 and a belt pulley 136 which are secured to the rotor member 130 for rotation therewith. A rotor drive motor 138 is carried by the frame element 88 and has a drive shaft 140 to which at the lower end is secured a belt pulley 142. Trained over the belt pulleys 136 and 142 is a drive belt 144. Secured between the drive motor 138 and the frame element 88, and associated with the drive shaft 140, is an electric brake 145. The drive motor 138 and related drive means is adapted to effect rotation of the rotor member 130 in increments of about 180° as will be more fully described hereinafter.

As shown generally in FIGS. 8, 9 and 10, inner cord engaging and laying means 146 is carried at the lower end of the stationary shaft 132 immediately below the rotor member 130, a pair of diametrically opposed outer cord engaging and laying means 148 are carried by the rotor member 130 on opposite sides of the rotative axis of the latter, a pair of diametrically opposed positioning pad units 150 are carried by the rotor member 130 on opposite sides of the rotative axis of the latter, and a rotor locating unit 152 is mounted on the intermediate frame section 84.

Referring now to FIGS. 19, 20 and 21, the inner cord engaging and laying means 146 comprises a stationary base 154 secured by bolts 156 to the lower flange portion 158 of the stationary shaft 132. Secured to the underside of the base 154 are tubes 160 in which are slidably mounted rods 162 anchored at their ends in the opposite sides of a generally U-shaped carriage 164. The carriage 164 is arranged for back-and-forth shuttle movement between a position on-center of the rotative axis of the rotor member 130 and a position off-center of this axis. The carriage 164 is normally biased by springs 166 to its off-center position which is determined by adjustment screws 168.

Mounted on the underside of the carriage 164 is a fluid motor 170 comprised of a cylinder 172 secured to the carriage 164 by bolts 174, a piston 176 slidable in the cylinder 172, and a piston rod 178 connected to the piston 176 and extending outwardly of the cylinder 172. Secured to the end of the piston rod 178 is a cord engaging and laying unit 180. Each of the outer cord engaging and laying means 148 comprises a fluid motor 170, which is mounted to the underside of the rotor member 130 by a suitable spacer (not shown) corresponding in depth to that of the base 154 and carriage 164, and a cord engaging and laying unit 180.

The upper end of the fluid motor 170 of the inner cord engaging and laying means 146 is adapted to be connected to a source of fluid under pressure or vacuum by a flexible conduit 182, fluid passageway means 184 formed in the stationary base 154, and fluid passageway means 186 formed in the stationary shaft 132. The upper ends of the fluid motors 170 of the outer cord engaging and laying means 148 are adapted to be connected to a source of fluid under pressure or vacuum by hose lines (not shown) extending to fluid passageway means 188 formed in the fluid gland 134 and communicating with an annular channel 190 and fluid passageway means 192 formed in the stationary shaft 132. The lower end of each fluid motor 170 is open to the atmosphere.

Mounted at the side of the inner cord engaging and laying means 146 is work belt advancing means 194. The advancing means 194 comprises a vertical bracket 196 which at its upper end is secured by bolts 198 to the carriage 164 and at its lower end is provided with a horizontal leg portion 200 that defines an upper clamp jaw. Secured to the bracket 196 is a solenoid 202 presenting a plunger 204 which projects downwardly through the upper clamp jaw 200 and has secured thereon a lower clamp pad or jaw 206. The clamp jaws 200 and 206 serve as clamp means 207 for engaging the edge of the work belt 48 when the solenoid 202 is energized. Also secured to the bracket 196 is a microswitch 208 having a switch pin 210 actuatable by a spring lever 212 engageable by the cord engaging and laying unit 180. Suspended from the stationary base 154 by support member 214 is a micro-switch 216 having a switch pin 218 engageable by the side of the bracket 196. When the switch pin 218 of the switch 216 is depressed, the solenoid 202 is energized and the clamp means 207 is closed. Upon release of the switch pin 218, the solenoid 202 remains energized until the switch pin 210 of the switch 208 is depressed. When the switch pin 210 is depressed, the solenoid 202 is deenergized and the clamp means 207 is opened. Upon release of the switch pin 210, the solenoid 202 remains deenergized until the switch pin 218 of the switch 216 is depressed.

As shown in FIGS. 22-29, each cord engaging and laying unit 180 comprises a casing 220 having upper and lower sections 222 and 224 suitably secured together, a plunger assembly 226 slidably mounted in the casing 220, and a pin unit 228 slidably mounted in the plunger assembly 226. The lower casing section 224 is formed with a bottom-end cord-clearance cutout 229. The plunger assembly 226 includes an elongated central body member 230 formed with an upper tubular section 232 and a lower tubular section 234. The upper end of an outer tubular member 236 is secured to the body member 230 by pins 238. The tubular member 236 is formed with a lower horizontal pressure head sector 240 which presents a front edge 242 that serves as a jaw, a back edge 244, and an intermediate arcuate recess 246. The tubular member 236 is also formed with an arcuate slot 248 in one wall thereof and with an irregular shaped opening 250 in the opposed wall thereof. Mounted about the lower tubular section 234 within the outer tubular member 236 is an inner tubular member 252. The tubular member 252 is formed with a lower horizontal pressure head sector 254 which presents a front edge 256 that serves as a jaw, a back edge 258, and an intermediate arcuate recess 260. The tubular member 252 is also formed with an arcuate slot 262 in one wall thereof. A pin follower 264 is secured in the casing 220 and projects into the arcuate slot 248 of the outer tubular member 236; and a pin follower 266 is secured in the casing 220 and projects through the opening 250 of the outer tubular member 236 into the arcuate slot 262 of the inner tubular member 252. The plunger assembly 226 is normally biased downwardly and outwardly of the casing 220 by a spring 268. The pin unit 228 comprises a pin member 270 which at its upper end is secured in a head member 272 slidably mounted in the lower tubular section 234 and which projects downwardly through the arcuate recesses 246 and 260 of the pressure head sectors 240 and 254. The pin member 270 is slidably guided in a bushing 274 secured in the lower tubular section 234. The pin unit 228 is normally biased downwardly and outwardly of the plunger assembly 226 by a spring 276.

The upper ends of the fluid motors 170 are normally connected to a source of vacuum, the pin members 270 of the cord engaging and laying units 180 are normally spaced slightly above the gum base 42 on the upper run of the work belt 48 as shown in FIGS. 22 and 27, and the upper ends of the fluid motors 170 are connected to a source of fluid pressure when cord 44 is to be laid on the gum base 42. When fluid pressure is admitted to the upper end of a fluid motor 170, the piston 176, piston rod 178 and cord engaging and laying unit 180 are urged downwardly from the positions shown in FIGS. 22 and 27 to the positions shown in FIGS. 23 and 29. Inititially, the pin member 270 engaged by cord 44 contacts the gum base 42 and belt 48, and moves relatively axially inwardly of the plunger assembly 226. Next, as the plunger assembly 226 approaches the gum base 42, the cord 44 is forced simultaneously against the gum base 42 and within the confines of the arcuate recesses 246 and 260 and the jaws 242 and 256 of the pressure head sectors 240 and 254 as shown in FIG. 24. Finally, as the plunger assembly 226 contacts the gum base 42 and moves relatively axially inwardly of the casing 220, the pin follower 264 riding in the arcuate slot 248, and the pin follower 266 riding in the arcuate slot 262, effect rotary movement of the jaws 242 and 256 toward each other whereby to engage and crimp together portions of the cord 44 adjacent to and engaged with the pin member 270 as shown in FIG. 25. In this manner, the cord 44 is crimped and laid onto the gum base 42. Upon relieving the fluid pressure and again connecting the upper end of the fluid motor 170 to vacuum, the cord engaging and laying unit 180 is withdrawn from the laid cord 44 and returned upwardly to the position shown in FIG. 22. During upward movement of the casing 220, the spring 268 restores the plunger assembly 226 to its normal position projecting outwardly of the casing 220, and, in conjunction with the pin followers 264 and 266 and slots 248 and 262, effects rotary opening of the jaws 242 and 256; while the spring 276 restores the pin member 270 to its normal position projecting outwardly of the plunger assembly 226.

Referring now to FIGS. 30–35, each positioning pad unit 150 comprises a positioning pad 278 secured to the lower end of a shaft 280 rotatably or pivotally mounted in the rotor member 130. Adjustably secured to the rotor member 130 about the upper end of the shaft 280 is a cup member 282 which encloses a torsion spring 284. One end of the spring 284 is secured at 286 to the cup member 282; the other end is secured in a slot 288 formed in the upper end of the shaft 280. The rotor locating unit 152 comprises a base frame 290 adjustably secured to the intermediate frame section 84 by bolts 292. A plate 294 and a toothed driven sheave 296 are secured to the upper end of a shaft 298 rotatably or pivotally mounted in the base frame 290. A pair of upright locating rolls 300 are rotatably supported on pins 302 secured at their lower ends in the plate 294. A toothed drive sheave 304 is secured to a shaft 306 rotatably mounted in the base frame 290. Trained over the sheaves 296 and 304 is a toothed belt 308 held under tension by idler rolls 310 rotatably supported by the base frame 290. Limited rotation of the drive sheave 304 is effected by a piston and cylinder assembly 312 having a cylinder 314 adjustably pivotally connected by a bolt 316 to the base frame 290 and having a piston rod 318 pivotally connected by a fastener 320 to the sheave 304.

The pair of locating rolls 300 are normally disposed in a first position (FIG. 30) to receive therebetween one of the positioning pads 278 at the termination of each 180° increment of rotation of the rotor member 130, and the torsion spring 284 of each positioning pad unit 150 normally angularly aligns the associated positioning pad 278 for entry between the locating rolls 300. At the termination of each 180° increment of rotation of the rotor member 130, the sheaves 304 and 296 and the plate 294 are rotated in one direction by the piston and cylinder assembly 312, and the locating rolls 300 are thereby pivoted with a positioning pad 278 therebetween from the first position (FIG. 30) 90° to a second position (FIG. 32) whereby to positively locate the rotor member 130. To permit the successive increment of rotation of the rotor member 130, the sheaves 304 and 296 and the plate 294 are rotated in the other direction by the piston and cylinder assembly 312, and the locating rolls 300 with the positioning pad 278 therebetween are thereby returned 90° to the first position (FIG. 30).

When forming a unitary annular tire breaker, an endless work belt 48, corresponding in peripheral length to the desired breaker length, is positioned over the pulleys 98 and 100 and placed under appropriate tension by adjustment of the head portion 104 of the spindle 102 (FIG. 9). A gum base is secured to the work belt 48 in the manner previously described in connection with FIG. 4, and the frame element 88 is vertically adjusted to properly position the height of the rotor member 130 in relation to the upper run of the work belt 48 (FIGS. 8 and 9). Initially, the carriage 164 is in its off-center position, the switch pin 218 of the switch 216 is depressed by the bracket 196 (FIG. 20), the solenoid 202 is energized, and the clamp means 207 is closed to clamp the edge of the work belt 48 (FIG. 19). The rotor member 130 is held in a start position (FIG. 11) by the rotor locating unit 152 (FIG. 32).

Figure 11:
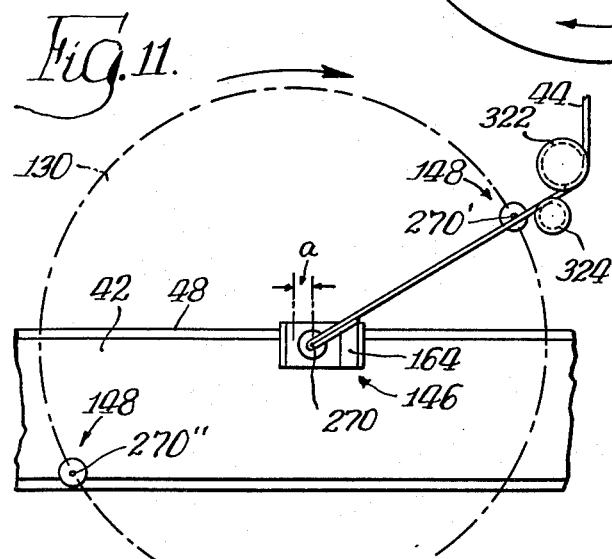
FIGS. 11-14 are schematic plan views showing the steps involved in forming a loop of cord with the apparatus of the present invention.
Figure 12:
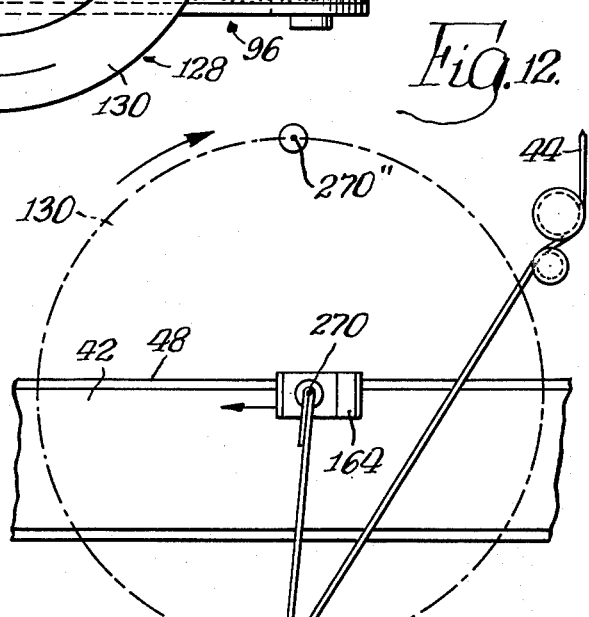
Figure 13:
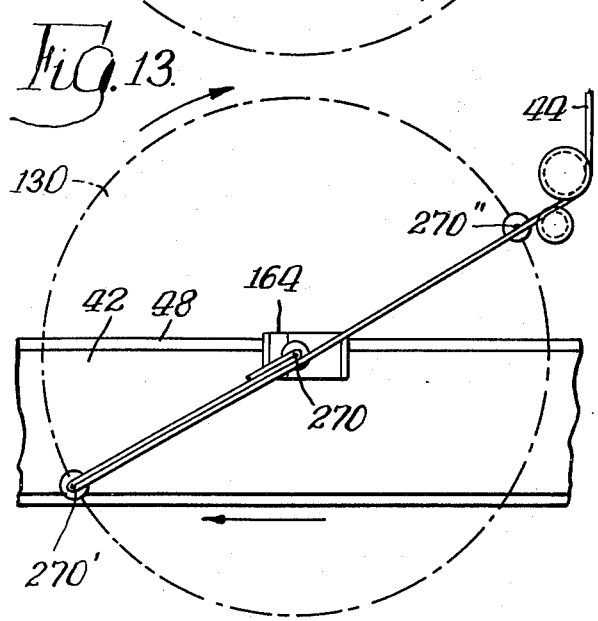

As shown in FIG. 11, a rubber covered cord 44 is withdrawn under controlled tension from a supply spool (not shown), passed between two grooved sheaves 322 and 324, and drawn along the leading side of the outer pin member 270'. The end of the cord 44 is doubled back around the inner pin member 270 and adhered to itself. The drive motor 138 is energized and the brake 145 is released (FIGS. 8 and 9); the positioning pad 278 engaged by the rotor locating unit 152 is returned to its normal attitude (FIG. 30); and the rotor member 130 is rotated clockwise, as viewed in FIGS. 11–14, through an initial arc or increment of about 180°.

During this 180° increment of rotation, the inner pin member 270 serves as a reaction point, while the outer pin member 270' serves as a cord collector. More particularly, the outer pin member 270' engages the cord 44 and folds the same, through the position shown in FIG. 12 to the position shown in FIG. 13, into a loop with the portions of the cord 44 extending between the pin members 270 and 270' being disposed in parallel juxtaposed relation diagonally of the work belt 48. Also, during this increment of rotation, the tension on the cord 44 moves the inner pin member 270 and the carriage 164 from the off-center position shown in FIG. 11 to the on-center position shown in FIG. 13. As the carriage 164 is thus moved, the work belt 48 is correspondingly advanced by the clamp means 207 (FIG. 19).

Figure 14:
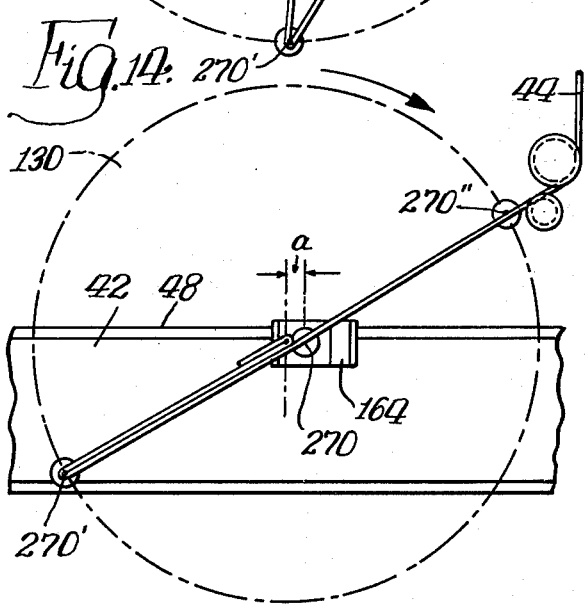
Figure 33:
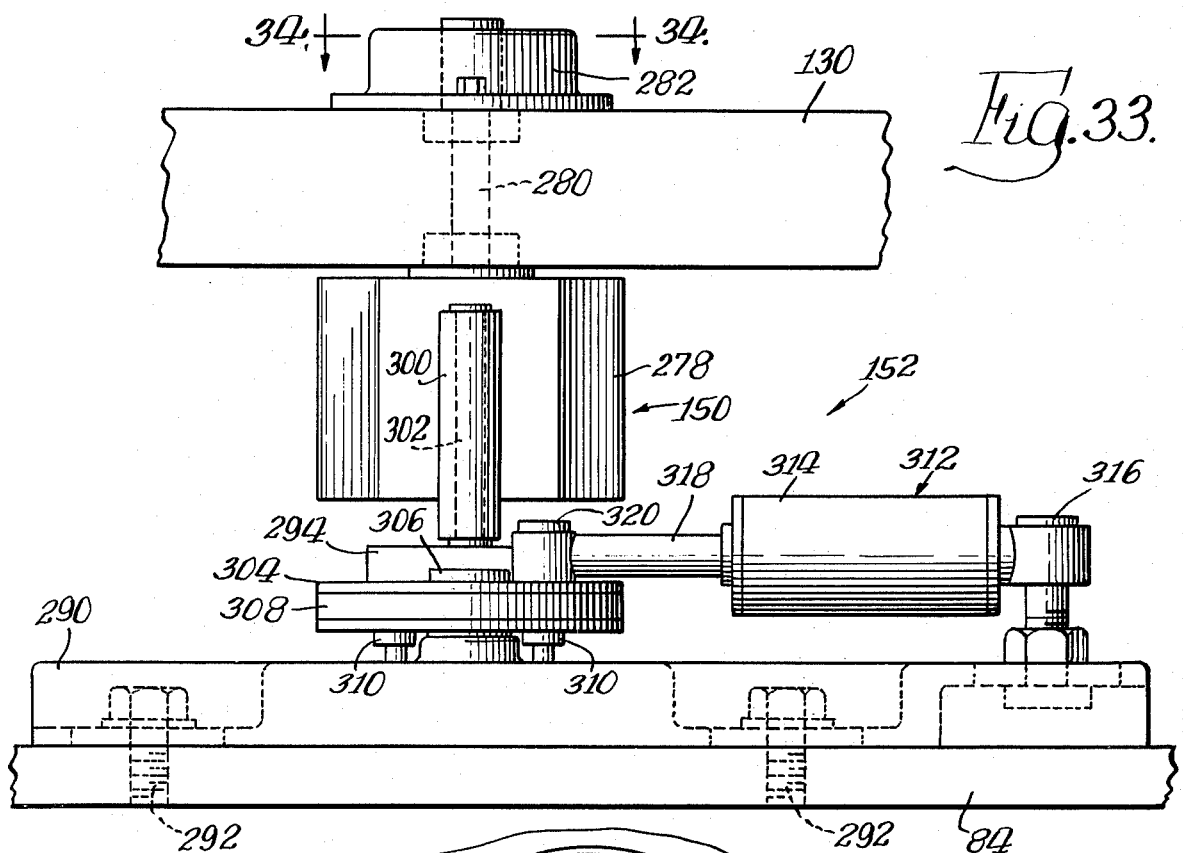
FIG. 33 is a rear elevational view of the rotor locating means of FIG. 30.
Figure 34:
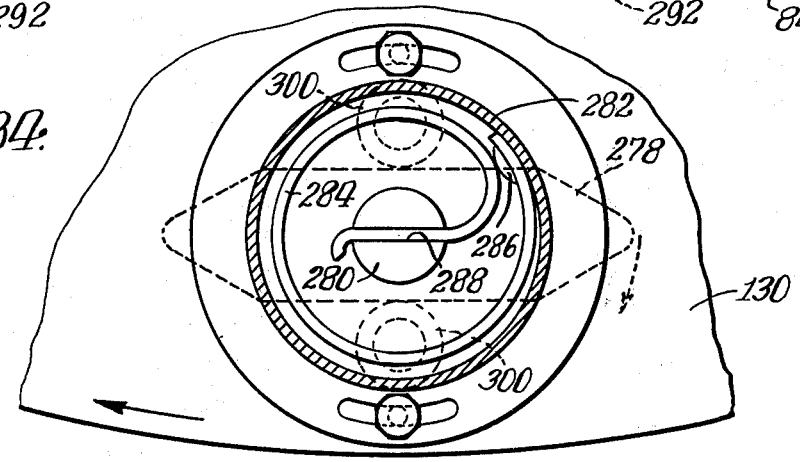
FIG. 34 is a sectional view taken substantially along the line 34—34 in FIG. 33 looking in the direction indicated by the arrows.
Figure 35:
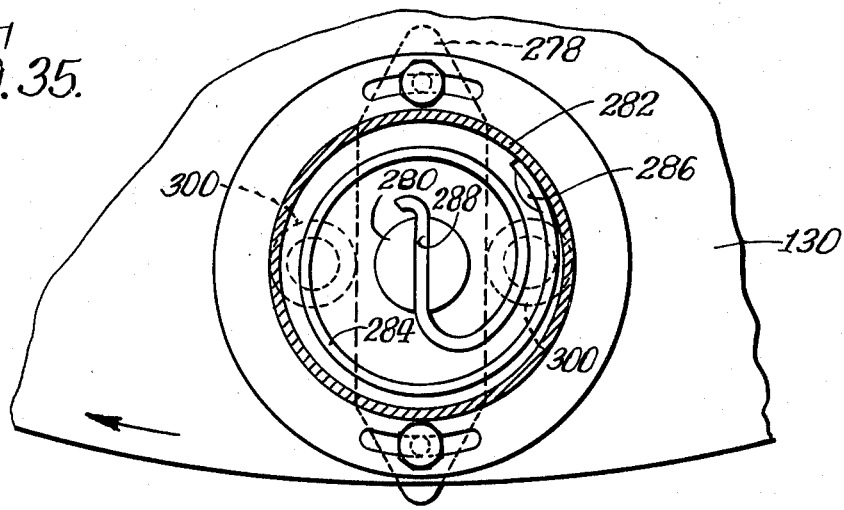
FIG. 35 corresponds generally to FIG. 34 but shows the components in a changed position.

At the termination of the 180° increment of rotation, the brake 145 (FIGS. 8 and 9) is applied and stops the adjacent positioning pad 278 between the locating rolls 300 (FIG. 30), the positioning pad 278 is immediately rotated to the position shown in FIG. 32 to positively locate the rotor member 130, and the cord engaging and laying units 180 are operated to crimp and press the cord 44 to the gum base 42. At this time, the switch pin 210 of the switch 208 is depressed by the inner cord engaging and laying unit 180 (FIG. 19), the solenoid 202 is deenergized, and the clamp means 207 is opened and released from the work belt 48. The ratchet means 112 (FIGS. 17 and 18) prevents backward movement of the work belt 48 that would otherwise occur as a consequence of the back tension created in the cord 44 during loop-forming of the latter. As the cord engaging and laying units 180 are retracted upwardly, the pin members 270 and 270' are withdrawn from the laid cord 44, the carriage 164 is returned to its normal off-center position as shown in FIG. 14, and the workbelt clamp means 207 is again closed on the work belt 48 (FIG. 19). The inner pin member 270, which has passed over the adjacent portion of the cord 44, is then extended downwardly at the leading side of the cord 44 by admitting slight fluid pressure to the inner fluid motor 170. With the outer pin member 270" already disposed at the trailing side of the cord 44, the apparatus is in condition to form and lay the next fold of loop of the cord 44.

The foregoing sequence of steps is successively repeated with the rotor member 130 being repeatedly started at the beginning, and stopped at the end, of each half-revolution; with the inner pin member 270 intermittently being engaged by the cord 44 and serving as a reaction point; and with the outer pin members 270' and 270" alternately engaging the cord 44 and serving as cord collecting members. In this manner, during successive 180° increments of rotation of the rotor member 130, the cord 44 is folded into successive side-by-side loops with portions of the cord disposed in parallel juxtaposed relation diagonally of the work belt 48 (FIGS. 15 and 16) as the belt 48 is advanced stepwise; and, at the termination of each 180° increment of rotation of the rotor member 130, in immediately formed loop of cord is laid onto the gum base 42. Loops of cord are formed and laid on the gum base 42 until the annular tire breaker is completed.

When laying cord 44, the carriage 164 shuttles back-and-forth, or moves between its on-center and off-center positions, a preset distance "a" indicated in FIGS. 11, 14 and 20. As a consequence, the work belt 48 is successively advanced stepwise in equal increments of distance a indicated in FIGS. 15 and 18. The distance a is equal to twice the thickness of the cord 44 divided by the sine of the angle of the cord 44 in relation to the work belt 48.

When forming a continuous tire breaker component, a gum base 42 is applied to an inextensible liner, and a continuously-moving freely-floating loop of these elements is directed across the upper surface of the work belt 48, as described in connection with FIG. 5. Cord 44 is folded into loops and laid onto the gum base 42 by the apparatus 50, in the same manner as described above in reference to forming an annular tire breaker, until the required length is realized.

While there has been shown and described a preferred embodiment of the present invention, it will be understood by those skilled in the art that various modifications and rearrangements may be made therein without departing from the spirit and scope of the invention.

The invention claimed is:

1. Apparatus for forming a tire breaker from a cord on a gum base comprising a work belt supporting the gum base, a rotor member mounted on frame means for rotation above said work belt on an axis perpendicular to said work belt adjacent one side thereto, means for rotating said rotor member in increments of about 180°, a pair of diametrically opposed outer cord engaging and laying means carried by said rotor member on opposite sides of said axis, an inner cord engaging and laying means mounted on said frame means adjacent said axis, said cord engaging said inner cord engaging and laying means and wrapping around it to form a portion of one edge of said tire breaker during successive increments of rotation of said rotor member, said outer cord engaging and laying means during successive increments of rotation of said rotor member alternately engaging the cord and folding the same into successive side-by-side loops to form portions of the other edge of said tire breaker and said inner and outer cord engaging and laying means laying each folded portion of the cord on the gum base at the termination of each increment of rotation of said rotor member.

2. The apparatus of claim 1 wherein said inner cord engaging and laying means comprises a stationary base, a carriage slidably mounted in said stationary base between positions on-center and off-center of said axis, means normally biasing said carriage to said off-center position, a casing carried by said carriage, and a pin member carried by said casing.

3. The apparatus of claim 2 including means carried by said carriage and selectively engageable with said work belt for advancing the same stepwise while said carriage is moved from said off-center position to said on-center position.

4. The apparatus of claim 1 wherein said inner and outer cord engaging and laying means each comprises a casing, a plunger assembly axially slidably mounted in said casing and having a pressure head, a pin member axially slidably mounted in said plunger assembly and biased outwardly of said pressure head for engagement with the cord, and said pressure head being arranged to engage the cord and press the same onto the gum base; wherein said inner cord engaging and laying means includes mounting means for mounting said casing thereof on said frame means; and wherein each of said outer cord engaging and laying means includes mounting means for mounting said casing thereof on said rotor member.

5. The apparatus of claim 4 wherein each of said mounting means includes a fluid motor for moving the associated casing toward and away from the gum base whereby to accommodate laying of the cord onto the gum base.

6. The apparatus of claim 4 wherein each of said plunger assemblies includes a pair of concentric tubular members, each tubular member is formed with a pressure head sector presenting a jaw, and each tubular member is formed with an arcuate slot in the wall thereof; wherein each of said casings is provided with a pair of diametrically opposed followers projecting into said arcuate slots of the associated tubular member; and wherein upon relative axial movement between an associated casing and plunger assembly said followers riding in said slots effect rotary movement of said jaws toward each other whereby to engage and crimp together portions of the cord adjacent to and engaged with said pin member.

7. The apparatus of claim 6 wherein, with respect to each associated casing and plunger assembly, said plunger assembly is normally biased outwardly of said casing, upon movement of said casing toward the gum base and contact of said plunger assembly with the gum base said relative axial movement occurs between said casing and said plunger assembly.

8. The apparatus of claim 6 including a pair of diametrically opposed positioning pads pivotally mounted on said rotor member on opposite sides of said axis, a locating unit mounted on said frame means and including a pair of spaced locating members normally disposed in a first position to receive therebetween one of said positioning pads at the termination of each increment of rotation of said rotor member, and means for pivoting said locating members with a positioning pad therebetween from said first position 90° to a second position at the termination of each increment of rotation of said rotor member whereby to positively locate said rotor member.

9. The apparatus of claim 6 wherein said inner cord engaging and laying means comprises a stationary base, a carriage slidably mounted in said stationary base between positions on-center and off-center of said axis, means normally biasing said carriage to said off-center position, a casing carried by said carriage, and a pin member carried by said casing.

10. The apparatus of claim 9 including means carried by said carriage and selectively engageable with said work belt for advancing the same stepwise while said carriage is moved from said off-center position to said on-center position.

11. The apparatus of claim 10 including a pair of diametrically opposed postioning pads pivotally mounted on said rotor member on opposite sides of said axis, a locating unit mounted on said frame means and including a pair of spaced locating members normally disposed in a first position to receive therebetween one of said positioning pads at the termination of each increment of rotation of said rotor member, and means for pivoting said locating members with a positioning pad therebetween from said first position 90° to a second position at the termination of each increment of rotation of said rotor member whereby to positively locate said rotor member.

12. The apparatus of claim 11 wherein said work belt is endless; and including spaced apart leading and trailing pulleys over which said endless work belt is trained, and ratchet means for preventing backward rotation of one of said pulleys.

13. The apparatus of claim 1 wherein said work belt is endless; and including spaced apart leading and trailing pulleys over which said endless work belt is trained, and ratchet means for preventing backward rotation of one of said pulleys.

14. The apparatus of claim 1 including a pair of diametrically opposed positioning pads pivotally mounted on said rotor member on opposite sides of said axis, a locating unit mounted on said frame means and including a pair of spaced locating members normally disposed in a first position to receive therebetween one of said positioning pads at the termination of each increment of rotation of said rotor member, and means for pivoting said locating members with a positioning pad therebetween from said first position 90° to a second position at the termination of each increment of rotation of said rotor member whereby to positively locate said rotor member.

15. The apparatus of claim 14 including means normally angularly aligning each of said positioning pads for entry between said locating members.

16. The apparatus of claim 14 wherein said inner cord engaging and laying means comprises a stationary base, a carriage slidably mounted in said stationary base between positions on-center and off-center of said axis, means normally biasing said carriage to said off-center position, a casing carried by said carriage, and a pin member carried by said casing.

17. The apparatus of claim 16 including means carried by said carriage and selectively engageable with said work belt for advancing the same stepwise while said carriage is moved from said off-center position to said on-center position.

* * * * *